United States Patent

Chapou

[15] 3,685,728
[45] Aug. 22, 1972

[54] THERMOSTATIC MIXING FAUCET

[72] Inventor: Yves Chapou, 21, Cours Marigny, Vincennes, France

[22] Filed: Nov. 4, 1970

[21] Appl. No.: 86,867

[30] Foreign Application Priority Data

Nov. 15, 1969 France...............6939350

[52] U.S. Cl.................................236/12
[51] Int. Cl..............................G05d 11/16
[58] Field of Search.............236/12, 12 A, 93

[56] References Cited

UNITED STATES PATENTS

| | | | |
|---|---|---|---|
| 3,388,861 | 6/1968 | Harding | 236/12 |
| 3,090,559 | 5/1963 | Bayer | 236/12 |
| 3,228,603 | 1/1966 | Norman | 236/12 |
| 3,112,879 | 12/1963 | Killias | 236/12 |

*Primary Examiner*—William E. Wayner
*Attorney*—Ernest Gontague

[57] ABSTRACT

Thermostatic mixing faucet of the type wherein a capsule adapted to expand under the influence of heat and disposed in the mixing chamber is adapted to actuate a cylindrical spool valve controlling the cold water and warm water inlet ports by reacting against a fixed but displaceable bearing member of which the change of position permits of adjusting the temperature of the mixed water. The outlet spout of said faucet is controlled by a second cylindrical spool valve concentric to the first one and of which the axial movements are controlled by means of a handwheel rotatably mounted to the faucet body, the adjustment of the mixed water temperature being controlled by a rotary knob provided at one end of said body and adapted, when rotated, to produce an axial movement of said bearing member engaged by said expansible capsule.

5 Claims, 4 Drawing Figures

THERMOSTATIC MIXING FAUCET

The present invention relates to thermostatically operating mixing faucets of the type adapted automatically to maintain the mixed water at a predetermined temperature.

More particularly, this invention relates to thermostatic mixing faucets wherein the member for regulating the temperature of the mixed water consists of a capsule adapted to expand under the influence of heat and disposed within the mixing chamber of the faucet so as to control the movement of a cylindrical spool valve controlling in turn the cold water and warm water inlet orifices.

In faucets of this type the expansible capsule reacts against a fixed yet displaceable member of which the change in the axial position permits of adjusting the temperature of the mixed water at the desired predetermined value.

However, mixing faucets of this type, as proposed heretofore, are objectionable on account of their complicated structure, which burdens unduly their final cost. On the other hand these faucets are objectionable because they do not comprise means permitting of adjusting at will the mixed water output. Under these conditions these faucets must be associated with another faucet, cock or valve for regulating the water output delivered to the final spout.

In certain known designs these two faucets, valves or cocks are combined into a single, common body. However, in this case this constitutes an extremely cumbersome device since it encloses two different faucets or valves having their axes disposed in two different directions. Moreover, the control members of these two faucets are disposed at different locations, which constitutes another drawback.

It is therefore the essential object of the present invention to provide a thermostatic mixing faucet of the same general type but so designed that the mixed water output adjusting device is somewhat incorporated in the body of the mixing faucet proper. On the other hand, this faucet is arranged with a view to have a simplified structure capable however of permitting a reliable operation thereof.

The present mixing faucet is characterized essentially in that its outlet orifice or spout is controlled by a second cylindrical spool valve concentric to the spool valve controlling the cold water and warm water inlet orifices, the axial movements of this second spool valve being controlled for example by means of a handwheel rotatably mounted on the faucet body in the vicinity of the knob controlling the adjustment of the mixed water temperature.

However, other features and advantages of the mixing faucet according to this invention will appear as the following description proceeds with reference to the accompanying drawing illustrating diagrammatically by way of example a typical form of embodiment of this faucet.

Figure 1:
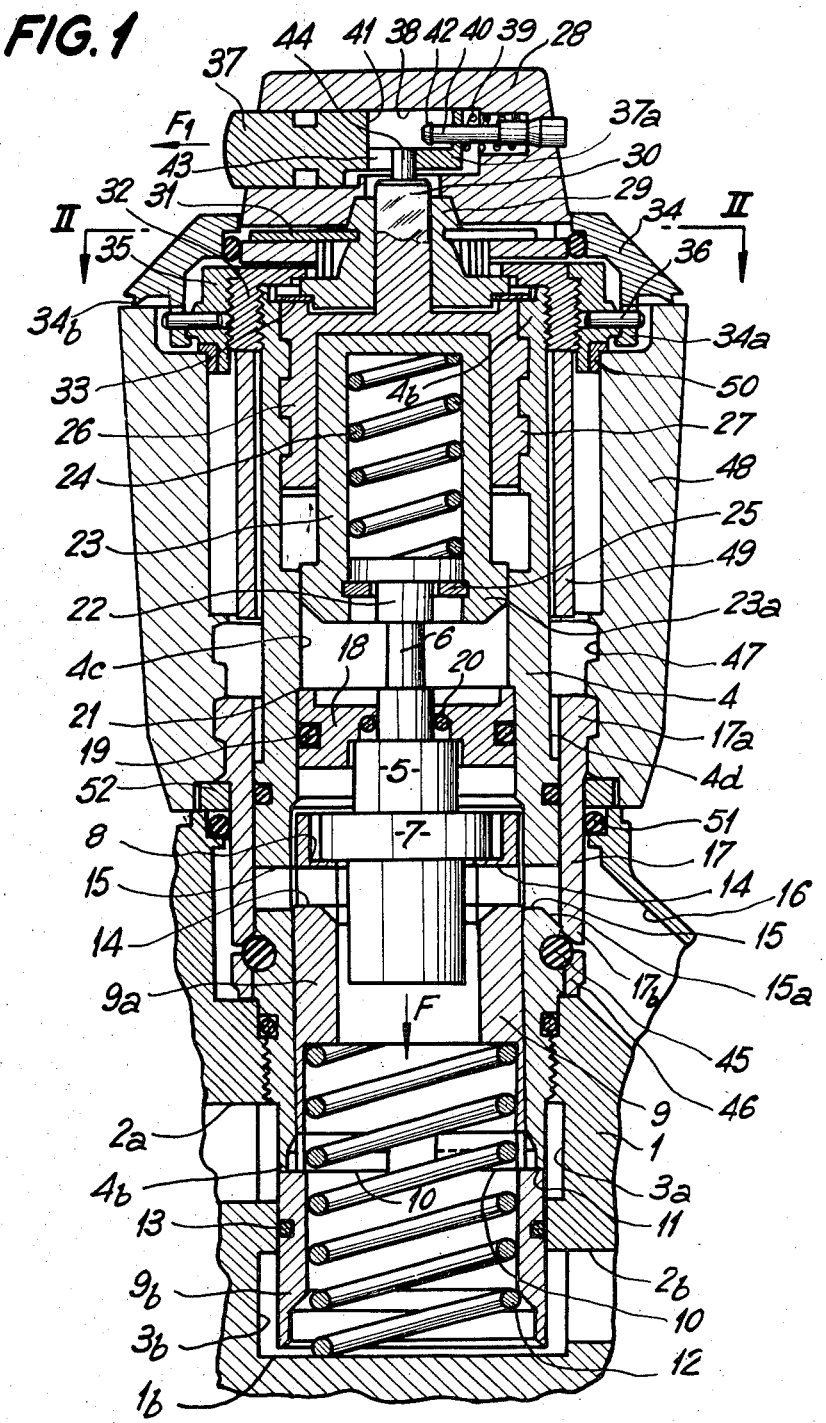
FIG. 1 is an axial sectional view of the thermal mixing faucet.

The body 1 of the faucet according to the present invention comprises two orifices 2a and 2b corresponding to the cold water inlet and to the warm water inlet, respectively.

Both orifices 2a and 2b open into two annular chambers 3a and 3b. Of course, these orifices 2a and 2b may be located at any desired point on the periphery of chambers 3a and 3b.

Secured to the body 1 is a socket 4 screwed therein and surrounding the member controlling the mixed water temperature regulation.

This member consists in this example of a capsule 5 containing a suitable material adapted to expand under the influence of heat to produce the axial movement of a rod 6 carried by said capsule. The latter carries a flange 7 housed in a chamber 8 formed at one end of a cylindrical spool valve 9 adapted to control the cold water and warm water inlet passages or ports.

This spool valve comprises two separate sections 9a and 9b. The first section 9a is slidably mounted in said fixed socket 4 and the other section 9b lies beyond the corresponding end 4b of said socket.

The first section of spool valve 9 is provided with one or plurality of ports 10 disposed just above the shoulder 11 provided on the corresponding end of the other section 9b.

By construction, this spool valve 9 is adapted to perform a relatively short stroke limited in one direction by the abutment of this section 9b against the bottom 1b of body 1 and in the opposite direction by the abutment of the shoulder 11 of the same spool valve 9 against the corresponding end 4b of said fixed socket 4.

In the position illustrated in FIG. 1 this spool valve is shown in its uppermost position, with its shoulder 11 abutting against the end 5b of fixed socket 4. Under these conditions, the notches 10 are somewhat recessed with respect to or within this socket 4, so that cold water cannot flow into the mixing chamber constituted by the inner space of spool valve 9. On the other hand, the warm water flowing into annular chamber 3b can also flow into this mixing chamber, since the end of the second section 9b of spool valve 9 is somewhat spaced from the bottom 1b of body 1 at that time.

Figure 4:
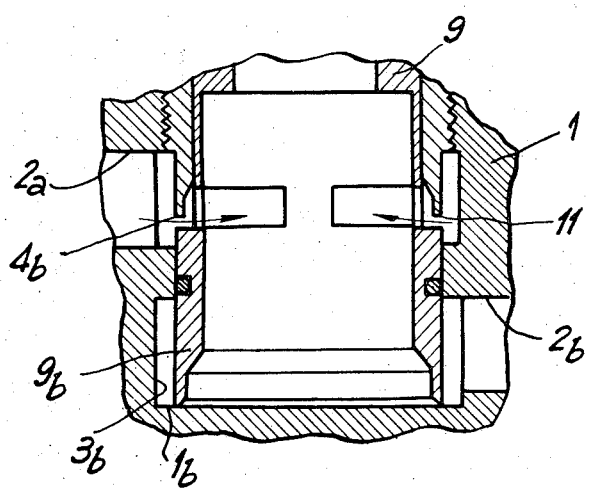
FIG. 4 is a fragmentary axial section illustrating another detail.

Of course, the downward movement of spool valve 9 (in the direction of the arrow F) will more or less uncover the port 10, thus permitting the ingress of cold water into the mixing chamber. But at the same time the flow of warm water is reduced in the same proportions and eventually this port is closed completely when the end of the second section 9b of spool valve 9 engages the bottom 1b of body 1, wherely the cold water inlet port is fully open (see FIG. 4).

However, a spring 12 constantly urges the spool valve 9 to its uppermost position shown in FIG. 1. A single O-ring 13 surrounding this spool valve is sufficient for preventing any communication between cold water and warm water.

In the vicinity of the chamber 8 receiving the flange 7 underlying the capsule 5, the first section 9a of spool valve 9 comprises a series of openings 14 to permit the egress of mixed water from the mixing chamber consisting of the inner space of spool valve. These openings 14 register with a series of corresponding ports 15 formed in the aforesaid fixed socket 4.

In the registering portion of the body 1 the faucet comprises a duct or spout 16 for the delivery of mixed water. However, a second spool valve 17 adapted to control the mixed water output is interposed between the ports 15 of fixed socket 4 and the outlet spout 16. The assembling and operating characteristics of this spool valve will be described more in detail presently.

As clearly shown in FIG. 1 the expansible capsule 5 extends within the first section 9a of spool valve 9 and the latter is surrounded by an annular space permitting the circulation of mixed water towards the outlet orifices 14 and 15. The mixed water is thus throttled in this annular space so that the capsule 5 is responsive to the water temperature.

The opposite end of the capsule body 5 penetrates into a washer 18 providing the necessary fluid-tightness towards the upper portion of the faucet, with the assistance of a pair of O-rings 19 and 20. This washer 18 is retained in its upper portion by a shoulder 21 formed on the inner wall of the fixed socket 4.

The upper end of the movable rod 6 of expansible capsule 5 registers with a bearing member 22 slidably mounted in a sleeve 23 closed at its opposite end. However, a relatively strong spring 24 bearing against the bottom of sleeve 23 urges the bearing member 22 in abutting relationship with respect to a circlip 25 carried by the corresponding end 23a of said sleeve. This end has a polygonal contour, for example a hexagonal contour, this also applying to the corresponding zone 4c of the inner wall of fixed socket 4. Thus, this sleeve 23 can slide in this socket but is prevented from rotating about its axis.

This sleeve is also disposed inside a cap 26 screwed in said fixed socket 4 by means of screw threads 27; the cap 26 is adapted to be rotatably driven by means of a knob 28 for adjusting the temperature of the mixed water.

This driving action is obtained through a ring 29 engaging a projection 30 of said cap 26. This projection has a polygonal, for example rectangular or square, cross-sectional contour, this also applying to the inner channel of driving ring 29. Thus, these two members are rotatably connected. However, the projection 30 of cap 26 is adapted to move axially within the ring 29.

The outer periphery of driving ring 29 is provided with a series of splines and the inner cavity of knob 28 is formed with corresponding grooves, so that the two members are rotatably rigid with each other.

Figure 2:
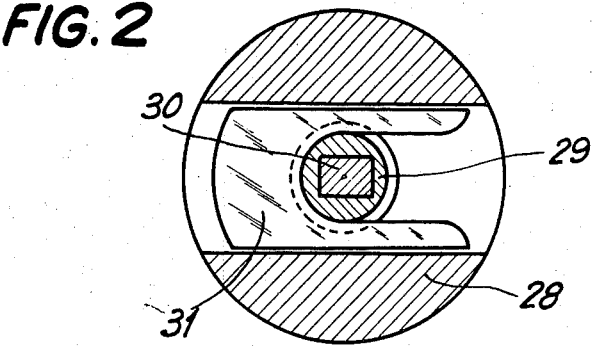
FIG. 2 is a section taken along the line II-II of FIG. 1.

On the other hand, the knob 28 is retained on driving ring 29 by means of a fork 31 engaging both the slots formed in this knob and a groove formed in the outer periphery of ring 29 (see FIG. 2).

This ring 29 is retained in position by a nut 32 engaging the correspondingly screw-threaded end 4b of fixed socket 4.

Moreover, a washer 33 is disposed under the flange of driving ring 29 and this flange is engaged in the opposite direction by the retaining nut 32.

Thus, when the knob 28 is rotated in a given direction the cap 26 is screwed in the fixed socket 4, and the sleeve 23 is caused to slide axially together with the bearing member 22 in the direction of the arrow F.

Now, as will be explained more in detail presently, the position of this bearing member determines the temperature of the mixed water. Thus, any angular variation in the position of control knob 28 is attended by a variation in the value of the temperature of the mixed water.

To permit the desired adjustment the adjustment knob 28 is surrounded by a dial consisting of a annular member 34 of flexible material such as molded plastic material, this annular member 34 being formed with a scale or suitable reference marks.

Moreover, this annular member 34 comprises a series of integral lugs 34a formed with an internal shoulder permitting their resilient engagement with a collar carried by a nut 35 screwed on said nut 32.

The annular member 34 is held against rotation by means of one or several pins 36 engaging corresponding holes formed in said nut 35. The angular distance contemplated between any pair of adjacent engagement lugs 34a is then substantially equal to the diameter of this pin, so that the annular member 34 be safely held against movement when properly positioned.

This mixing faucet comprises a safety system preventing the user from inadvertently causing abnormally hot mixed water to flow out from the faucet, as this might be very dangerous.

This safety system comprises a control knob 37 slidably mounted in a cavity 38 formed in said temperature adjusting knob 28 and perpendicular to the axis of rotation of this knob 28.

One end of said sliding knob 37 projects from the outer peripheral surface of rotary knob 28.

Its opposite end is responsive to a thrust spring 39 surrounding a rod 40 rigid with said rotary knob 28. The free end of rod 40 engages a cavity 41 formed in sliding knob 37. However, this rod 40 extends through the corresponding end of this sliding knob and terminates with a shoulder 42 adapted to act as a retaining stop to said knob.

This knob 28 is also formed with a longitudinal slot 43 adapted to receive a cylindrical stud 44 carried by the projection 30 provided at the upper end of rotary cap 26.

However, when the faucet is adjusted to deliver cold water at its outlet, the cap 26 is spaced from the washer 33 acting as an upper abutment member by a distance corresponding to or greater than the length of said stud 44. Under these conditions, the stud 44 is released from the slot 43 of sliding knob 37 and the latter is urged home by the spring 39 in the direction of the arrow $F_1$ whereby the stud 44 is no more aligned with the slot 43 but registers with the solid portion of the corresponding end 37a of knob 37.

Figure 3:
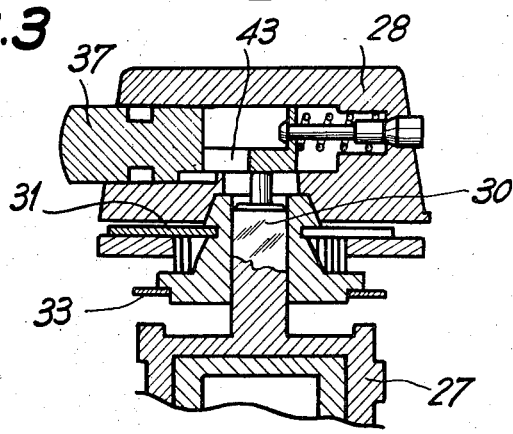
FIG. 3 is a fragmentary axial section showing the safety system incorporated in this faucet.

If then the temperature adjustment knob 28 is rotated in the direction corresponding to high temperatures of the mixed water the stud 44 will abute against the end 37a of knob 37 (see FIG. 3).

The movement of rotation of adjustment knob 28 is thus stopped to make it positively impossible to cause water heated at an abnormally high temperature to flow out from the faucet.

In fact, to produce high-temperature water the user must rotate the adjustment knob 28 while depressing the sliding knob 37 in the direction opposite to that shown by the arrow $F_1$ in order to bring its slot 43 in alignment with stud 44. Under these conditions, this stud can engage the slot so that the cap 26 can move upwards and thus cause the temperature of the mixed water to increase until this cap abuts against the upper washer 33, this position corresponding to the maximum temperature of the mixed water.

The present safety system may be arranged with a view to stop the rotation of control knob 28 at a predetermined temperature of the output water which might be considered as dangerous for the users. This temperature may be for example 40°C (104°F), but of course another limit value may be selected to this end, if desired, without departing from the basic principle of the invention.

As already explained in the foregoing one of the essential features characterizing this thermostatic mixing faucet resides in the fact that a mixed water output adjusting device is incorporated in the faucet body proper.

In fact, the magnitude of the water output is controlled by a second cylindrical spool valve 17 already mentioned hereinabove, this other spool valve 17 being concentric to the spool valve 9 provided for adjusting the cold water and warm water proportions. The inner edge of the lower end 17b of this second spool valve is very slightly tapeor bevelled and registers with an O-ring 45 for sealing the joint.

This O-ring 45 is partially engaged in a groove formed in the outer periphery of the fixed socket 4 and is held therein by an annular member 46 constituting an insert rigid with socket 4, the inner wall of annular member 46 being formed with a tapered portion engaging said O-ring 45.

When assembling the faucet the socket 4 is screwed in the body 1 after having positioned the O-ring 45.

Then the height of annular member 46 is so determined that the O-ring 45 is compressed when the socket 4 is fitted in position. Therefore, this O-ring is safely retained and cannot undergo any extrusion as a consequence of the depression effect. In any case the specific mounting of this O-ring constitutes likewise an essential feature of the faucet according to this invention.

In the closed position shown in FIG. 1 the end 17a of the spool valve exerts by itself a pressure on the sealing ring 45.

To open the outlet passage it is therefore only necessary to move the spool valve 17 upwards, i.e. in the direction opposite to that shown by the arrow F.

To this end, the opposite end 17a of this spool valve comprises a few initial screw threads engaging internal threads 47 formed inside a rotary control handwheel 48. Besides, the spool valve 17 is held against rotation about its axis by the fact that it comprises an internal portion of polygonal cross-sectional contour, such as a hexagonal contour, the corresponding portion 4d of fixed socket 4 comprising an external contour of matching configuration.

Thus, by rotating this handwheel 48 it is possible to move the spool valve 17 in one or the other direction. In this respect it may be noted that the progressiveness of the output adjustment is obtained by virtue of the presence of a tapered portion 15a provided at the bottom of the outlet port 15.

In the position providing the maximum opening of the outlet passage, the spool valve 17 abuts against the corresponding end of a sleeve 49 provided to this end and surrounding the fixed socket 4.

Besides, the control handwheel 48 is retained in position by the aforesaid nut 35. However, a friction washer 50 may advantageously be interposed between this nut 35 and the rotary handwheel 48. Moreover, the fixed annular member 34 carrying the temperature adjusting dial is provided with a flexible lip 34b engaging the upper edge of said handwheel 48 so as to prevent the ingress of dust and foreign bodies into the faucet.

The fluid-tightness between the body 1 and spool valve 17 is obtained by providing an O-ring 51 protected by a washer 52 interposed between the handwheel 48 and body 1.

Thus, the device for thermostatically adjusting the mixed water and the device for adjusting the faucet output are combined together within the faucet body, their various component elements being substantially concentric to one another.

Besides, the two control members of these two devices, namely the knob 28 and handwheel 48, may revolve about a common axis. Under these conditions the present faucet is characterized by reduced over-all dimensions, in contrast to hitherto known mixing faucets of the same type which are associated with an output adjusting faucet. On the other hand, these two control members are disposed very close to each other, so that their actuation is greatly facilitated.

A perfect operation is derived by the very design of this thermostatic mixing faucet. This operation takes place as follows:

1. Assuming that the desired temperature of the mixed water is adjusted initially, before opening the faucet outlet spout, two cases may arise, namely:

a. During this operation, the bearing member 22 may be moved to a position in which it is somewhat spaced from the rod 6 of capsule 5.

In this case, when opening the faucet spout by rotating the handwheel 48, warm water is allowed to penetrate into the mixing chamber from the bottom of the faucet, since the spool valve 9 is held in its raised position by spring 12. The capsule 5 is thus heated to expand the material contained therein, for example wax. As a consequence, the movable rod 6 is moved in a direction opposite to that of arrow F and engages the bearing member 22. The latter remains stationary since spring 24 is relatively strong, so that the body proper of capsule 5 is caused to move in the direction of arrow F, thus carrying along the spool valve 9 and closing the warm water inlet passage and concomitantly opening the cold water inlet passage.

Thus, cold water is allowed to penetrate into the mixing chamber and therefore the wax or similar expansible substance contained in capsule 5 is contracted; therefore, the spool valve 9 is raised by spring 12 and warm water can again penetrate into said chamber.

After a few oscillations, the capsule 5 and spool valve 9 are stabilized and the spool valve is stopped in an intermediate position between the opening and closing of the warm water inlet passage, so that the desired proportions of cold water and warm water are obtained to deliver mixed water at the proper temperature.

The value of this temperature is therefore properly determined by the position of said bearing member 22.

b. During the initial adjustment, it is also possible that said bearing member 22 engages the rod 6 of capsule 5.

In this case, the rod 6 is pushed back in the direction of the arrow F, so that the wax contained in the capsule is compressed (low-temperature zone). Said bearing member 22 is thus moved to the position corresponding to the selected temperature value but the spool valve 9 remains in the preceding position corresponding to the warm water opening. If in this case the faucet is opened by actuating the handwheel 48, the same effects as those described hereinabove will take place.

However, it may happen that the inner temperature of the faucet is higher than the actually desired temperature, for example in case one user has just taken water at 45°C and another user desires a temperature of 35°C. In this case, if the knob 28 is rotated in the direction towards lower temperatures while the faucet is turned off, the bearing member 22 will tend to push back the rod 6 of capsule 5 but unsuccessfully, so that it will compress the spring 24 considerably stronger than spring 12. Therefore, said bearing member 22 will cut-off completely the warm water supply at 1b and fully open the cold water inlet 4b.

If under these conditions the user opens the faucet by turning the handwheel 48, cold water will be allowed into the faucet, thus cooling the capsule 5. Thus, the rod 6 compressed by spring 24 will penetrate into the wax until bearing member 22 engages the circlip 25.

At a well-defined moment the spring 12 is again operative in the direction opposite to F and compresses the rod 6, but this causes the opening of the warm water inlet; thereafter, the effects are the same as those described hereinabove in the case of the determination of the selected mixture temperature.

2. If, during the operation, the warm water being supplied to the mixing chamber increases, the capsule 5 will expand and thus push back the spool valve 9 to modify accordingly the proportions of cold water and warm water in order to restore the temperature of the delivered mixed water to the desired value.

Of course, the reverse operation takes place in case for any reason the temperature of the warm water supplied to the faucet decreased.

3. During the operation of the faucet, it is possible to modify at will the temperature of the mixed water by simply rotating the knob 28 in the proper direction and thus change as desired the proportions of cold water and warm water.

4. It may be noted that during the operation of the faucet of this invention the bearing member 22 remains stationary. In fact, as already explained, the force of spring 24 is considerably in excess of the thrust exerted by the expansible capsule 5 on its movable rod 6. Besides, the faucet could also operate without this spring.

The only function of this spring 24 is explained hereinafter:

If the desired temperature of the mixed water is relatively high, corresponding to an elongation of movable rod 6, and if a lower temperature is subsequently desired (or even if only cold water is desired), the rod 6 must be pushed back by rotating the control knob 28 in the proper direction.

This operation causes the wax in the capsule 5 to be compressed. Now a sudden rotation of control knob 28 could be attended by the bursting of said capsule 5. However, the spring 24 acts as a damping element by permitting a momentary backward movement of bearing member 22, if necessary, in order to preclude any risk of this kind. Then, the spring 24 restores the bearing member 22 to its normal position, thus pushing back the capsule 5 and therefore the adjustment spool valve 9.

5. It may be seen that the internal arrangement of the faucet is advantageous in that it reduces the efforts due to the warm water and cold water pressure, which are exerted on the capsule 5 proper. Now since these efforts are transmitted from the cap 23 they might render the actuation of knob 28 very difficult.

Of course, the mixing faucet according to this invention should not be construed as being strictly limited by the single form of embodiment described hereinabove by way of example, since it will readily occur to those conversant with the art that many modifications and variations may be brought thereto without departing from the spirit and scope of the invention.

Thus, the safety system provided for stopping the rotation of control knob 28 could also be dispensed with or replaced by any other suitable safety device.

Besides, the expansible capsule 5 itself could be replaced by any other member adapted to expand under the action of heat.

Considering its multivarious advantageous features it is obvious that the faucet according to this invention can be used in many applications. In general, it may be used for sanitary apparatus, such as showers, washbasins, bathtubs, and also for sinks and the like.

What I claim is:

1. A thermostatic mixing faucet, comprising
    a hollow body defining two inlet ports for cold and warm water, respectively, and an outlet spout for mixed water,
    a hollow fixed socket disposed inside of said hollow body and secured thereto,
    a first cylindrical spool valve means partially disposed in said socket for controlling the cold and warm water inlet ports of said hollow body, said first spool valve defining therein a mixing chamber for mixing of cold and warm water, a bearing member axially displaceably disposed in said body,
    an expansible capsule disposed in said mixing chamber and expansible under the influence of heat,
    said capsule operatively disposed to actuate said spool valve by reacting against said bearing member, said first spool valve having an outlet opening for mixed water,
    said socket having another opening for mixed water registering with said outlet opening of said first spool valve and with said outlet spout of said hollow body,
    a second cylindrical spool valve means concentric to said socket and interposed between said socket and said hollow body, controlling communication with said outlet opening of said socket, and
    a handwheel means rotatably mounted to one end of said body and for actuating said second spool valve means, a rotary knob means provided at said one end of said body for producing an axial movement of said bearing member.

2. The mixing faucet, as set forth in claim 1, further comprising a knob and means for setting said faucet disposed at an end of said socket corresponding to said one end and operatively interrupting one of said inlet ports, said first spool valve means has openings leading into said mixing chamber, said openings being operatively controlled by the position of said first spool valve means, which covers and uncovers one of said inlet ports in said hollow body outside of said socket, and an end of said first spool valve means being open and controlled displaceably relative to a closed end of said socket for determining the quantity of water entering said mixing chamber from the other of said inlet ports.

3. Mixing faucet according to claim 1, in which the fluid tightness of the outlet spout is obtained by using an O-ring surrounding said fixed socket and held in position by an insert ring provided on said fixed socket, the second output adjusting spool valve being adapted to engage said O-ring.

4. Mixing faucet according to claim 1 in which said expansible capsule comprises a movable rod adapted to engage said bearing member and said member bears in turns, through the medium of a coil compression spring, against a member adapted to be moved in the axial direction as a consequence of the rotation of the mixed water temperature adjusting knob, said last-named axially movable member being screwed into said fixed socket containing the spool valve for adjusting the cold water and warm water proportions.

5. Mixing faucet according to claim 4, further comprising a safety system adapted to prevent the untimely delivery of water heated at an abnormally high temperature, this system comprising a control knob slidably mounted in the rotary knob provided for adjusting the temperature, said control knob comprising a slot adapted to receive a stud carried by the member controlling the bearing member engaged by the movable rod of said expansible capsule, a spring constantly urging said knob to a position wherein said slot is not normally aligned with the stud of said member, whereby said stud will abute against said sliding knob in order to prevent the rotation of said temperature adjusting knob in the direction of higher temperatures, unless the operator voluntarily depresses the sliding knob of said safety system, against the force of the thrust spring thereof.

* * * * *